United States Patent
Gunther et al.

[11] Patent Number: 5,574,819
[45] Date of Patent: Nov. 12, 1996

[54] RECEPTACLE FOR A CABLE END PIECE

[75] Inventors: Uwe Günther; Hans-Dieter Weigel, both of Berlin, Germany

[73] Assignee: Siemens Aktiengesellschaft, München, Germany

[21] Appl. No.: 495,555

[22] PCT Filed: Feb. 1, 1994

[86] PCT No.: PCT/DE94/00118

§ 371 Date: Sep. 25, 1995

§ 102(e) Date: Sep. 25, 1995

[87] PCT Pub. No.: WO94/18585

PCT Pub. Date: Aug. 18, 1994

[30] Foreign Application Priority Data

Feb. 3, 1993 [DE] Germany ............ 43 03 737.2

[51] Int. Cl.⁶ .................................... G02B 6/02
[52] U.S. Cl. ............ 385/139; 385/86; 385/137
[58] Field of Search .................. 385/134–139, 385/86, 87

[56] References Cited

U.S. PATENT DOCUMENTS

| | | | |
|---|---|---|---|
| 4,319,802 | 3/1982 | Bowes | 385/86 |
| 4,447,120 | 5/1984 | Bursuk | 385/136 |
| 4,948,222 | 8/1990 | Corke et al. | 385/100 |
| 4,984,865 | 1/1991 | Lee et al. | 385/53 |
| 5,418,874 | 5/1995 | Carlisle et al. | 385/139 X |

FOREIGN PATENT DOCUMENTS

| | | |
|---|---|---|
| 0 199 267 | 10/1986 | European Pat. Off. . |
| 1 247 410 | 10/1960 | France . |
| 38 20 950 | 12/1989 | Germany . |
| 2 030 723 | 4/1980 | United Kingdom . |

OTHER PUBLICATIONS

Patent Abstracts of Japan, vol. 7, No. 82, 22 Jan. 1983 & JP-A-58-011 906.

Primary Examiner—John D. Lee
Assistant Examiner—Phan T. H. Palmer
Attorney, Agent, or Firm—Kenyon & Kenyon

[57] ABSTRACT

A cable sheath of cable end piece is partially removed, exposing at least one signal conductor and the ends of an elongated stress-relief device. The cable end piece is inserted through inlet orifice into a container. A spreading sleeve is inserted into the end of the cable sheath, thus spreading out the ends of the stress-relief device and therefore widening the cable sheath beyond the cross section width (or diameter) of the inlet orifice.

20 Claims, 3 Drawing Sheets

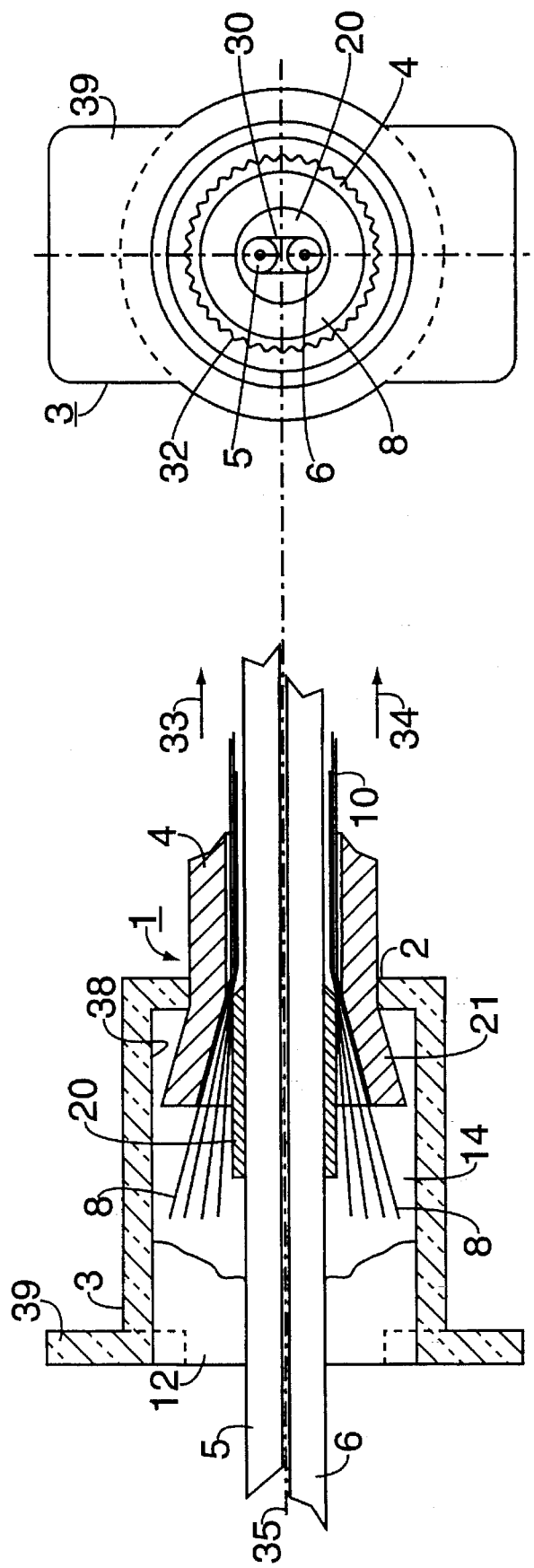

RECEPTACLE FOR A CABLE END PIECE

BACKGROUND OF THE INVENTION

The present invention pertains to a receptacle arrangement for a cable end piece having a sheath that is at least partially removed at the end, exposing at least one signal conductor, especially an optical fiber, and the end of an elongated stress-relief device. The present invention also pertains to a receptacle arrangement having a container with an inlet orifice into which the cable end piece is inserted, and with an outlet orifice through which at least the signal conductors exit, and a casting compound surrounding the signal conductors, the ends of the stress-relief device and the cable sheath in the container.

Methods of protecting cable connections against external influences are described in U.S. Pat. No. 4,319,802 and U.S. Pat. No. 4,447,120. In these patents, the sheath is removed from the cable end pieces and the end of a stress-relief device in the cable is secured by crimping (e.g., on a metal sleeve). The signal conductor, especially an optical fiber that is sensitive to kinks, is also exposed to external shearing effects. Crimping cannot assure a homogeneous transmission of forces. Instead, a few fibers carry a disproportionate amount of the forces, especially with a fiber-shaped stress-relief device. The cable sheath must be secured separately against twisting due to torsion.

U.S. Pat. No. 4,984,865 discloses a receptacle arrangement for a cable end piece where the cable sheath is partially removed at the end, thus exposing the end of an optical fiber and the end of an elongated stress-relief device. The end piece is inserted into a plug connector housing that contains a thermoplastic material. This known receptacle arrangement does not assure that the cable sheath will be reliably secured at high tensile forces or that there will be a symmetrical distribution of fibers. There is a danger that the fibers might collapse during injection or fusion of the thermoplastic material, which is introduced in the form of granules.

German patent (OLS) 3,820,950 describes a receptacle arrangement of the type described above, but with an improvement with regard to the problem of securing the stress-relief device symmetrically. The cable end piece from which some of the cable sheath is removed at the end is inserted through an inlet orifice into a container. Removing some of the cable sheath at the end exposes an optical fiber and the end of an elongated stress-relief device (Aramid fibers). The optical fiber exist through an outlet orifice of the container. After inserting the cable end piece, a material that can be injected and hardened is introduced into the container in liquid or molten form in front of the exposed ends of the fibers. This known receptacle arrangement is relatively expensive to manufacture because it requires an injection molding machine. The material that is injected at about 200° C. represents a great thermal stress for the optical fiber which is very sensitive to temperature. The shield-like fanning out of the ends of the stress-relief device, which is to be achieved with the injection, is not always assured in practice. If the distribution of force at the ends of the stress-relief device is not homogeneous, this may result in breakage of individual stress-relief fibers.

With the known type of receptacle, the cable sheath is not secured to prevent it from twisting with respect to the container. When tensile forces act on the sheath, there is a substantial risk that the sheath can be pulled relatively easily out of the casting compound. German patent (OLS) 3,820, 950 does not describe any anti-kink protection (maintaining a minimum bending radius) for the cable end piece.

Therefore, an object of the present invention is to create a receptacle arrangement that provides the most comprehensive possible protection for the cable end piece and the signal conductor from external stresses, especially tensile, shearing and torsional stresses.

SUMMARY OF THE INVENTION

This and other objects are achieved according to the present invention with a receptacle arrangement of the type described above, where a spreading body is inserted at least partially into the end of the cable sheath. The ends of the stress-relief device are fanned out, and the dimensions of the spreading body are such that the cable sheath is widened beyond the cross section of the inlet orifice.

An important advantage of the present invention is that, in addition to the container, only one other, extremely inexpensive, part (i.e., the spreading body) is necessary to impart an extremely high resistance to external stresses to the receptacle arrangement. The present invention provides an improved resistance to external stresses in comparison with the receptacle arrangement known from German patent (OLS) 3,820,950. The spreading body widens the cable sheathing so that its cross section is larger than the cross section of the inlet orifice in at least one location. This secures the end of the cable sheath in the container even under high tensile forces. The spreading body causes the ends of the stress-relief device to fan out uniformly at a given angle from the axis of the cable. After the casting compound has cured, the individual ends of the stress-relief device contribute uniformly to the transfer of forces. The casting compound can therefore be optimized only with regard to its setting effect - in contrast with the casting compound of the known receptacle arrangement of German patent (OLS) 3,820,950. The spreading body is preferably designed as a sleeve, especially a spreading sleeve.

A preferred embodiment of the present invention provides that the casting compound is a light-activated or light-curing resin system. Such known resin systems (such as the light-activated resin system known under the brand name DELO-DFA939 from DELO or the light-curing resin system known under the brand name LCR0607 from ICI) allow the casting compound to be activated in a controlled manner. The light-activated resin system can be conveyed past a light source to activate it and then introduced into the container where the activated polymerization takes place. This resin system cures completely very rapidly, so the manufacturing cycles can be shortened considerably. These resin systems and even two-component epoxy resins can be used to a particular advantage in field assembly.

In order to achieve especially good curing on all sides when using light-activated or light-curing resin systems, the container should preferably be made of a transparent material. In this regard, it is advantageous with regard to the curing of the resin material near the signal conductor if the spreading sleeve is made of a transparent material.

An advantageous embodiment of this receptacle arrangement with regard to securing several signal conductors is the fact that the spreading body (the spreading sleeve) has a hollow and essentially oval internal cross section.

In order to further increase the anti-twist property of the cable sheath relative to the container, an advantageous embodiment of the present invention provides for the inlet orifice to have a profiled inside contour, preferably with teeth, that presses into the material of the cable sheath.

In order to secure the cable also against external shearing forces acting on the sheath, an advantageous embodiment of this invention provides for at least one inside wall of the container that runs in the axial direction of the cable end piece to be roughened and/or profiled.

Another advantageous embodiment of this invention is the fact that the inlet orifice is surrounded by an anti-kink sleeve that extends away from it and is an integral part of the container. Therefore, no additional part requiring extra handling is required to achieve adequate protection of the cable end piece from kinking. In contrast with the rest of the container, the anti-kink sleeve may be made of an opaque elastic material if the container is designed as a two-component plastic part, for example.

BRIEF DESCRIPTION OF THE DRAWINGS

FIG. 1 is a cross-section of a receptacle arrangement constructed according to the present invention.

FIG. 2 is a view of the receptacle arrangement of FIG. 1.

DETAILED DESCRIPTION

Figure 3:
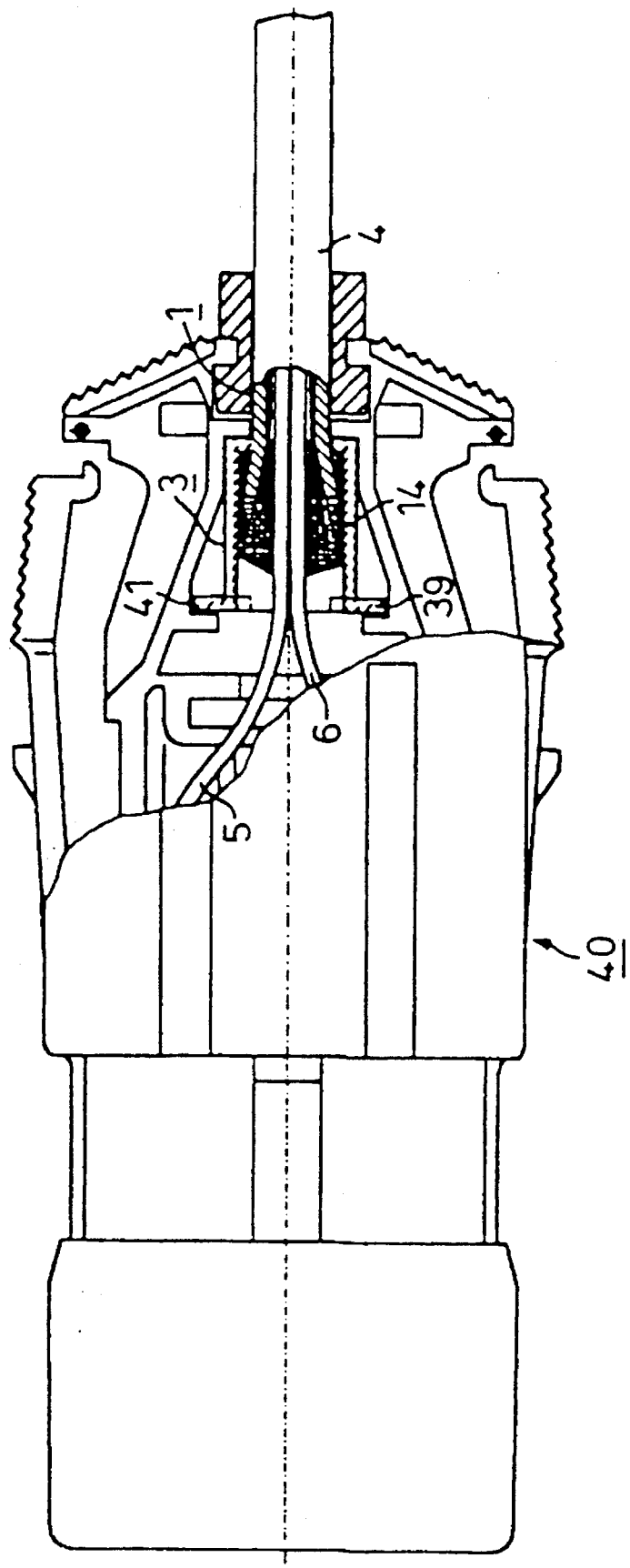
FIG. 3 is a duplex plug with a receptacle arrangement.

FIG. 1 is a receptacle arrangement for a cable end piece (1) that is inserted into an inlet orifice (2) of a pot-shaped cylindrical container (3). A cable sheath (4) of cable end piece (1) is removed in the front area, so that signal conductors (5) and (6), in the form of optical fibers, and an end (8) of an elongated stress-relief device (10) (Aramid fibers) are exposed. The container has an outlet orifice (12) that is flush with inlet orifice (2); signal conductors (5) and (6) exit from this outlet orifice (12). The container is filled with a casting compound (14) that preferably comprises a fully cured two-component epoxy resin or a light-activated and/or light-curing resin system. Casting compound (14) surrounds signal conductors (5) and (6), ends (8) of the stress-relief device (10)$_2$ and cable sheath (4). A sleeve-like spreading body (spreading sleeve) (20) is inserted from the free ends of signal conductors (5) and (6) under the spreading ends (8) of the stress-relief device (10) and into an end (21) of cable sheath (4). Spreading sleeve (20) is designed so that it expands cable sheath (4) beyond the cross section width (or diameter) of inlet orifice (2). Container (3) is made of a transparent material when a light-curing resin system is used as a casting compound (14). In this case, casting compound (14) can be exposed to light from all sides to accelerate curing. Spreading sleeve (20) is then also preferably made of a transparent material, so that the casting compound between the spreading sleeve (20) and the signal conductors (5) and (6) will cure quickly and completely.

FIG. 2 shows a frontal view of the receptacle arrangement of FIG. 1, omitting some of casting compound (14), with an oval design of hollow cross section (30) of spreading sleeve (20). Ends (8) of the stress-relief fibers are fanned out uniformly in casting compound (14) and thus guarantee a homogeneous transfer of tensile forces. Inlet orifice (2) has a toothed inside contour (32) that presses into the material of cable sheath (4). After inserting spreading sleeve (20), a slight tension can be exerted on cable sheath (4) in the direction of arrows (33) and (34) (FIG. 1) during assembly.

The inside wall of the container that runs in an axial direction (35) of cable end piece (1) is roughened or profiled to make it possible to absorb the shearing forces acting on cable sheath (4). A flange (39) serves to secure container (3) in a fixed axial position so it cannot twist.

FIG. 3 shows the receptacle arrangement illustrated in FIGS. 1 and 2, inserted here into a duplex plug housing (40). The receptacle arrangement is fixed with its flange in corresponding recesses (41) in housing (40), so that the cable end piece (1) is secured and cannot twist with respect to housing (40). The receptacle arrangement may of course also be inserted into a simplex plug, an instrument housing or a distributor.

Figure 4:
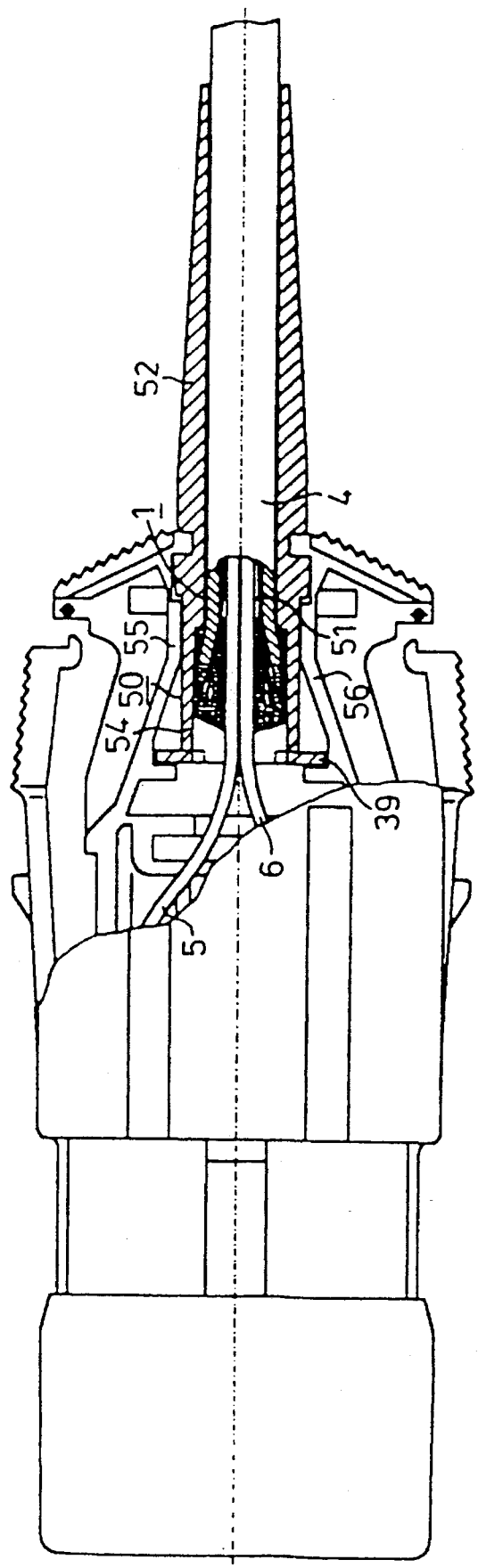
FIG. 4 is a duplex plug with a second embodiment of a receptacle arrangement according to the present invention.

FIG. 4 shows an alternative embodiment of a receptacle arrangement according to this invention, where corresponding elements already illustrated in FIGS. 1 and 2 are labeled with the same key numbers. Cable end piece (1) having a sheath (4) that has been partially removed is accommodated in a container (50) having an inlet orifice (51) that is surrounded by an anti-kink sleeve (52) extending away from it. Anti-kink sleeve (52) is an integral part of container (50). Container (50) may be made of a two-component plastic part, so the front receptacle area (54) can be optimized separately with regard to its strength, and the area of anti-kink sleeve (52) can be optimized separately with regard to its flexibility. When container (50) is made of a homogeneous elastic material, webs (55) and (56) may be provided in the housing to prevent an area (54) of the container from being torn out.

The present invention makes it possible to secure a cable end piece in a simple manner from a manufacturing standpoint, while requiring very few individual parts and reliably absorbing tensile forces, shearing forces and torsional loads and at the same time securing the signal conductors axially and protecting the sheath from kinking.

What is claimed is:

1. A receptacle arrangement for an end piece of a cable, said arrangement comprising:

a cable including a cable sheath enclosing at least one signal conductor and an elongated stress-relief device, said cable having an end piece such that an end of the cable sheath at the end piece of said cable is sufficiently removed to expose at least one of said signal conductors and an end of said stress-relief device;

a container having an inlet orifice, such that the end piece of said cable is inserted into said inlet orifice, and an outlet orifice, such that at least one of said signal conductors exits through said outlet orifice;

a casting compound inside said container such that said casting compound surrounds at least one of said signal conductors, the end of said stress-relief device and at least a portion of said cable sheath in said container;

a spreading body that is at least partially inserted into the portion of said cable sheath in said container, said spreading body spreading out the end of said stress-relief device, said spreading body is dimensioned so that a diameter of the end of said cable sheath in said container is widened beyond the diameter of the inlet orifice of said container.

2. The receptacle arrangement of claim 1 wherein said casting compound is at least one of a light-activated and a light-curing resin system.

3. The receptacle arrangement of claim 2 wherein said container is made of a transparent material.

4. The receptacle arrangement of claim 3 wherein said spreading body is made of a transparent material.

5. The receptacle arrangement of claim 4 wherein in said spreading body has an essentially oval and hollow internal cross-section.

6. The receptacle arrangement of claim 3 wherein in said spreading body has an essentially oval and hollow internal cross-section.

7. The receptacle arrangement of claim 3 wherein the inlet orifice of said container has a profiled inside contour with teeth that press into an outer material of said cable sheath.

8. The receptacle arrangement of claim 3 wherein the inlet orifice of said container is surrounded by an anti-kink sleeve that extends away from said inlet orifice, said anti-kink sleeve is an integral part of said container.

9. The receptacle arrangement of claim 2 wherein said spreading body is made of a transparent material.

10. The receptacle arrangement of claim 9 wherein in said spreading body has an essentially oval and hollow internal cross-section.

11. The receptacle arrangement of claim 2 wherein in said spreading body has an essentially oval and hollow internal cross-section.

12. The receptacle arrangement of claim 2 wherein the inlet orifice of said container has a profiled inside contour with teeth that press into an outer material of said cable sheath.

13. The receptacle arrangement of claim 2 wherein the inlet orifice of said container is surrounded by an anti-kink sleeve that extends away from said inlet orifice, said anti-kink sleeve is an integral part of said container.

14. The receptacle arrangement of claim 1 wherein said signal conductor is at least one optical fiber.

15. The receptacle arrangement of claim 1 wherein in said spreading body has an essentially oval and hollow internal cross-section.

16. The receptacle arrangement of claim 1 wherein the inlet orifice of said container has a profiled inside contour with teeth that press into an outer material of said cable sheath.

17. The receptacle arrangement of claim 1 wherein an inside wall of said container, running in an axial direction of the end of said cable, is roughened.

18. The receptacle arrangement of claim 17 wherein an inside wall of said container, running in an axial direction of the end of said cable, is profiled.

19. The receptacle arrangement of claim 1 wherein an inside wall of said container, running in an axial direction of the end of said cable, is profiled.

20. The receptacle arrangement of claim 1 wherein the inlet orifice of said container is surrounded by an anti-kink sleeve that extends away from said inlet orifice, said anti-kink sleeve is an integral part of said container.

* * * * *